AUTOMATIC SYNTHESIS OF DISTRIBUTED-CONSTANT, RESISTANCE-CAPACITANCE FILTER HAVING ARBITRARY RESPONSE CHARACTERISTIC

Filed May 1, 1967

INVENTORS F. K. BECKER
H. R. RUDIN, JR.

BY J. P. Kearns

ATTORNEY

United States Patent Office 3,466,538

Patented Sept. 9, 1969

3,466,538

AUTOMATIC SYNTHESIS OF DISTRIBUTED-CONSTANT, RESISTANCE-CAPACITANCE FILTER HAVING ARBITRARY RESPONSE CHARACTERISTIC

Floyd K. Becker, Colts Neck, and Harry R. Rudin, Jr., Lincroft, N.J., assignors to Bell Telephone Laboratories, Incorporated, Murray Hill, N.J., a corporation of New York Filed May 1, 1967, Ser. No. 635,047

Int. Cl. G01r 27/02

U.S. Cl. 324—57 7 Claims

ABSTRACT OF THE DISCLOSURE

A distributed constant resistance-capacitance filter can be fabricated as a thin-film integrated circuit. By providing resistive voltage dividers at taps on such a filter and proportioning connection points to these resistive dividers for algebraic summation of tap signals a transversal filter with an arbitrary response characteristic can be constructed. Voltages appearing at these taps responsive to an input impulse can be weighted and summed in any desired manner to contain arbitrary response characteristics.

Field of the invention

This invention relates to distribute-constant, resistance-capacitance networks used as linear filters and particularly to the adjustment of thin-film embodiments of such networks to obtain arbitrary response characteristics.

Background of the invention

Time-domain or transversal filter equalizers have been proposed which generate impulse responses of arbitrary characteristic. The general transversal equalizer comprises a lumped-constant resistance-inductance-capacitance (RLC) delay-line portion with evenly spaced taps, individual weighting means having a range of adjustment between plus and minus unity gain connected to each tap, and a summation circuit for combining the weighted tap outputs at a common point. When the weighting means are properly adjusted, the summed output responsive to an input pulse can be made to assume any desired arbitrary impulse response within the range of the number of taps provided. The arbitrary responses can be made equivalent to such filter specifications as low-pass, bandpass, high-pass and band-rejection networks.

The tapped distributed resistance-capacitance (RC) transmission line has recently been investigated as a new approach to the realization of a wide class of linear filter specifications. Where the RLC lumped-constant delay line may be conceived as minimizing the resistance and emphasizing the capacitance and inductance to obtain true delay, the RC distributed-constant line virtually eliminates the inductance but still exhibits a frequency dispersion in the nature of delay. With the near-elimination of the inductance the RC line becomes adaptable to physical realization in tantalum thin-film monolithic embodiments.

Tap connections can be made at intervals along the distributed resistance and the voltages appearing at these taps responsive to an input impulse can be weighted and summed in any desired manner to obtain arbitrary response characteristics. Weighting can be accomplished by further deposits of resistive material at each tap with connections to algebraic summing circuits. The summing circuits can be active or passive and further can be implanted on the same substrate as the RC line by integrated-circuit techniques.

Description of the prior art

In the copending patent application of R. W. Lucky, Ser. No. 472,146 filed July 15, 1965 (now U.S. Patent Number 3,375,473, issued Mar. 26, 1968) and entitled "Automatic Equalizer for Analog Channels," basic principles for automatically adjusting weighting attenuators in an LC transversal filter equalizer in accordance with the differences in impulse response of an actual transmission channel to identical test pulses are disclosed. In accordance with these principles the differences in response between the actual and ideal channels to these pulses are correlated in product modulators with the outputs of each tap on the transversal filter. The resultant products are either positive or negative and only the polarities are of interest. Responsive to these polarities incremental increases or decreases in the attenuation or weighting provided at each tap are made in a direction to reduce the magnitude of the response differences. Repeated responses to a train of impulses eventually reduce the difference or error signals to a minimum value consistent with the size of the incremental step. The transversal filter in combination with the transmission channel will then exhibit substantially the same impulse response as the ideal channel.

These principles can be applied to an adjustable network to cause it to match the response of a reference network independently of the presence of a transmission channel. This principle has been so applied in the case of a tapped acoustic delay line as disclosed in the copending application of F. K. Becker, Serial No. 635,048, filed of even date herewith and entitled "Adjustable Delay Line Filter."

Summary of the invention

It is an object of this invention to synthesize an arbitrary frequency response characteristic from a distributed-constant, resistance-capacitance transmission line by transversal equalizer techniques.

It is another object of this invention to adapt mean-square equalizer techniques to the final fabrication of monolithic transversal equalizers of arbitrary response characteristic.

According to this invention, a distributed-element, resistance-capacitance transmission line is modified to provide spaced tapping points to which are joined pairs of weighting resistors having one common junction with each tapping joint and outer ends connected to one or the other of two summing buses. The summing busses are further connected for algebraic summation of signals appearing thereon at a common output point.

In an illustrative embodiment of this invention a resistive tantalum film is deposited over a conductive counter-electrode on a substrate to form an RC transmission line with resistors branching from spaced taps therealong. The outer ends of the branching resistors are in turn connected to substantially nonresistive buses. Integrated-circuit tandem operational amplifiers are further provided on the same substrate to connect the summing buses to a common output.

Further in accordance with this invention, a test arrangement for trimming the branching resistors to the proper weights to effect a response characteristic matching that of a reference filter is described. Responsive to a train of input impulses applied simultaneously to the RC transmission line and a reference filter, whose characteristic is to be matched, the differences between the summed output of the RC transmission line and that of the reference filter are correlated step by step with the signal at each line tap to obtain an indication of which branching resistor connection to a summing bus should be trimmed. The difference signal is an error to be reduced to a minimum. The correlator output is positive or negative according to whether the ratio between the branching resistors at each tap is to be increased or decreased. An algorithm has been derived to insure optimum independent adjustment of each tap ratio. When each pair of branching resistors has been properly trimmed, the RC transmission line exhibits substantially the same transfer function as the reference network.

It is a feature of this invention that a given tapped resistance-capacitance transmission line with branching resistive members at each tap can be adjusted to exhibit an arbitrary response characteristic without any change in the basic transmission line.

Description of the drawing

The above and other objects and features of this invention will be appreciated from a consideration of the following detailed description and the drawing in which.

Detailed description

Figure 1:
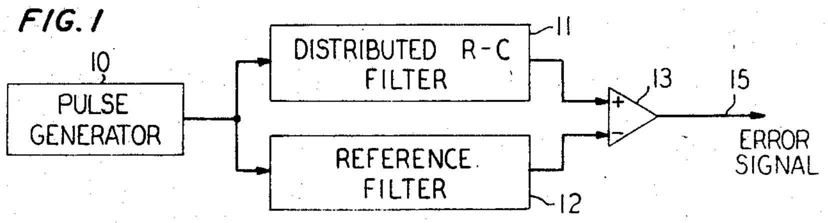
FIG. 1 is a block diagram of the basic principle by which a resistance-capacitance transmission line is adjusted to obtain an arbitrary response characteristic.

FIG. 1 illustrates the general principle employed by R. W. Lucky to generate an error signal from which the adjustment of tap attenuators in a delay line type of transversal filter is accomplished. In the cited Lucky application identical pulse generators are employed at the transmitter and receiver stations of a data transmission system. The output of one generator traverses a transmission channel and a transversal filter equalizer. The output of the other generator traverses a reference filter at the receiving station. When the two generators are properly synchronized, the difference in the outputs of the reference filter and the transversal equalizer is a measure of the error in the response of the transmission channel with respect to the reference filter. Correlation of the transversal filter tap outputs with this difference signal permits a determination of appropriate adjustments of attenuators on the transversal filter to obtain from the channel a response matching that of the reference filter.

The arangement of FIG. 1 aadapts the Lucky principle to the adjustment of frequency-sensitive networks to match a reference characteristic. Since the transmission channel is eliminated, the Lucky principle is modified to have the same pulse generator drive both the filter to be adjusted and the reference filter. In FIG. 1 the output of pulse generator 10 drives both the distributed-constant filter 11, which is to be adjusted, and the reference filter 12. The difference in outputs of the two filters 11 and 12 is taken in difference amplifier 13 to form an error signal on line 15. This error signal is correlated with the output of taps on adjustable filter 11 in a manner similar to that taught by Lucky.

Figure 2:
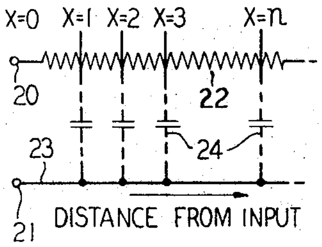
FIG. 2 is a schematic representation of a resistance-capacitance transmission line of the type to which this invention is directed.

For the present exemplary embodiment a distributed-constant, resistance-capacitance filter is to be adjusted to a preselected reesponse characteristic. A generalized distributed RC filter is schematically represented in FIG. 2. As a preferred embodiment a tantalum thin-film circuit is assumed. On a substrate (not shown) an electrode 23 is deposited. On top of this electrode resistive material of uniform width is further deposited. This is represented by the standard resistance symbol 22 of uniform resistance per unit length. A uniform capacitance per unit length, indicated schematically by broken line capacitors 24, exists between the resistive film and base electrode 23. The line is considered to be of sufficient length that end reflections are of little consequence, although the occurrence of such reflections does not vitiate the technique disclosed herein.

Figure 3:
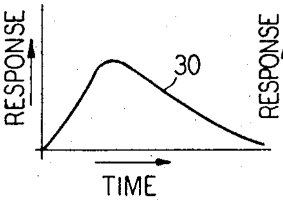
FIG. 3 is a waveform diagram showing the response to an impulse applied to the input of the transmission line of FIG. 2 as observed at an arbitrarily located tap thereon.

The general impulse response of a distributed RC filter is shown in FIG. 3. For a positive impulse applied to input terminals 20 and 21 of FIG. 2, the response observed at an arbitrary distance from the input resembles that of curve 30 in FIG. 3. There is first an exponential rise to a smooth peak, followed by an exponential decay. In general the time constants of rise and decay are different. The peak amplitude observed at different points along the line has been found to vary inversely as the square of the distance from the input. Further, the time at which the peak is reached varies directly as the square of the distance from the input. At the input of the line the rise will be very steep. At taps farther down the line the rise will be gentler.

Figure 4:
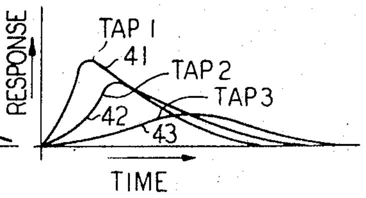
FIG. 4 is a waveform diagram showing the response to an impulse applied to the input of the transmission line of FIG. 2 as observed at several spaced taps thereon.

FIG. 4 shows three representative curves 41, 42 and 43, such as would be observed at successive taps 1, 2, and 3 on the RC transmission line diagrammed in FIG. 2. Each curve is linearly independent of the others.

Inasmuch as the peaks of curves observed at different taps along the line are in inverse proportion to the square of the distance from the input, it may be advantageous from the practiacal standpoint to space the taps according to the square root of the index number of the tap. Thus, if the distance of the first tap from the input is considered as one unit, the second tap is spaced by the square root of two=1.414 units from the input, the third tap, by the square root of three=1.732 units; the fourth tap, by the square of four=2 units; and so forth. Then, the peak amplitudes at successive taps will be in the ratios of 1, ½, ⅓, ¼, and so forth. Furthermore, the instants at which the peaks occur will be in linear order 1, 2, 3, 4, and so forth.

It will be understood that spacing of taps according to a square-root or other law is suggested only by way of example, and not by way of limitation. The actual tap spacing may be quite arbitrary, and still remain consonant with the principle of this invention.

Figure 5:
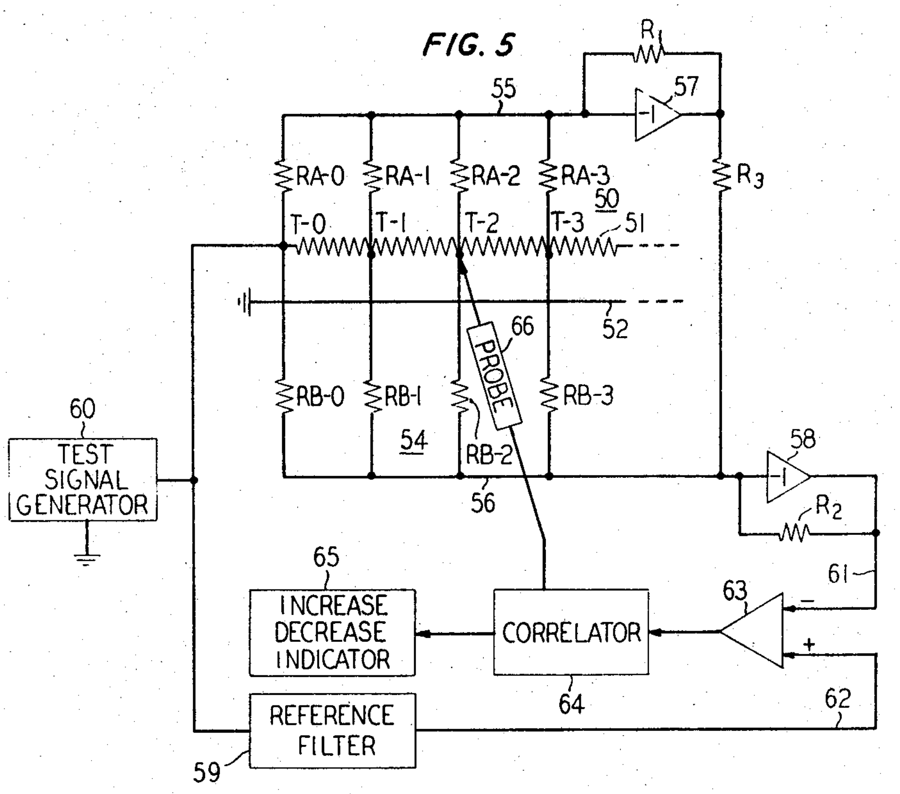
FIG. 5 is a block schematic diagram of a test arrangement according to this invention by which a determination is made as to how the branching resistors are to be trimmed in a distributed-constant, resistance-capacitance transmission line to impart to it an arbitrary response characteristic.

According to this invention, filters of arbitrary characteristic, including low-pass, bandpass and band-rejection types, can be synthesized from an RC transmission line of the type described above by providing resistive voltage dividers at the input and at spaced tapping points therealong and algebraic summing means for the outputs of these dividers. FIG. 5 is a block schematic diagram of such an RC transmission line in combination with circuit means for correlating the outputs at taps on the transmission line with a difference or error signal resulting from a comparison of the summed output of the RC transmission line with that of a reference filter responsive to a common train of pulses.

In FIG. 5 the RC transmission line is generally designated 50 and comprises a resistive portion 51 and a base electrode 52. It will be understood that there is a distributed capacitance existing between resistance 51 and the base electrode 52. The RC line has taps T–0, T–1, T–2 . . . T–N spaced therealong with refernce to input tap T–0, by way of example in proportion as the square root of the index number. At each tap there are joined resistive weighting members RA–0 to RA–N, each having one terminal at a given tap and another terminal joined to a common bus 55. At each tap there are also joined further resistive weighting members RB–0 to RB–N, each having one terminal at a given tap and another terminal joined to a common bus 56. Physically, RC-line 50 may advantageously be deposited in a meandering, i.e., zig-zag, fashion on the base electrode 52 to conserve space. Overall the line may resemble a damped sinusoidal wave. Weighting resistors RA and RB are joined at the peaks of such a sinusoid. Resistors RA and RB are deposited directly on a substrate and not on the base electrode to avoid any additional capacitive effects.

Operational amplifiers of well-known type, such as are indicated by triangles 57 and 58, are connected electrically to buses 55 and 56, respectively. Each amplifier is an inverting type with a feedback resistor $R_1$ or $R_2$ connected between input and output. The output of amplifier 57 is further connected to the input of amplifier 58 by an additional resistor $R_3$, as shown. The output of amplifier 58 on line 61 therefore provides an algebraic summation of currents flowing in buses 55 and 56. Amplifiers 57 and 58 may conveniently be of the integrated circuit type deposited on the same substrate as RC-line 50.

In order to impart an arbitrary transfer characteristic to RC-line 50 signals appearing at the respective taps T–0 through T–N are weighted by trimming resistors RA and RB. The amount to be trimmed is determined by exciting RC-line 50 by a train of impulses from a test signal generator 60. At the same time a reference filter 59, whose transfer characteristic is to be matched, is excited by the same train of impulses from generator 60. The differences between the outputs of reference filter 59 on lead 62 and that of line 50 on lead 61 are taken in difference amplifier 63 to obtain an error signal. This error signal is further correlated sequentially with the several outputs of taps T on RC-line 50 through probe 66 attached to correlator 64. The output of correlator 64, a product modulator in a practical embodiment, is a positive or negative indication given in block 65. On the basis of the polarity of such indication either the RA or RB weighting resistor at the particular tap is trimmed as more fully explained below. Trimming techniques are well known in the printed circuit art. Trimming may be done manually or by means of abrasive jets, by way of example.

The tapped RC transmission line filter of this invention may be analyzed as follows. For an input $d(t)$ there results at an arbitrary $n$th tap a response $h_n(t)$. These responses are to be given weightings $\alpha_n$ and summed by operational amplifiers 57 and 58 in a manner that allows the weightings to assume positive and negative values. The response voltages appearing at each tap are of the same polarity. Numerically, $$\alpha_n = \frac{R(RB)_n - R(RA)_n}{(RB)_n (RA)_n} \tag{1}$$

where R is the value of the operational amplifier feedback resistors.

For the purposes of filter synthesis the resistors RA and RB must be adjusted to minimize the integral-squared error.

The summed output $q(t)$ of the RC transmission line appearing on lead 61 is given by the relation $$q(t) = \sum_{n=0}^{N} \alpha_n h_n(t) \tag{2}$$

for an RC transmission line with N+1 taps.

The integral-squared error I is given by $$I = \int_0^\infty \left[ h(t) - \sum_{n=0}^{N} \alpha_n h_n(t) \right]^2 dt \tag{3}$$

where $h(t)$ is the desired response.

The optimum value of $\alpha_n$ (which determines the ratio of RB to RA at each tap) is found by differentiation of I in Equation 3 with respect to the individual $\alpha_n$'s.

Thus, $$\frac{\partial}{\partial \alpha_i} = -2 \int_0^\infty [h_i(t)] \left[ h(t) - \sum_{n=0}^{N} \alpha_n h_n(t) \right] dt = \tag{4}$$

According to mean-square equalizer principles, Equation 4 has a physical interpretation as $$\frac{\partial}{\partial \alpha_i} = -2 \int_0^\infty [\text{ith tap voltage}]\,[\text{error signal}]\,dt \tag{5}$$

The minus sign in Equations 4 and 5 indicates that an inverse adjustment is required.

Thus, the partial derivative of Equations 4 and 5 is the cross-correlation of the tap voltage with the error signal. This cross-correlation is obtained in FIG. 5 in correlator 64. The positive or negative output in block 65 indicates which of weighting resistances RA or RB is to be trimmed. Trimming removes resistive material to decrease the cross-sectional area, and thereby increases the overall resistance. Thus, a negative output indicates that $\alpha_n$ must be increased and, according to Equation 1, this is accomplished most easily by trimming $RB_n$ to increase its resistance. Conversely, a positive output indicates $\alpha_n$ must be decreased, and this readily is accomplished by trimming $RA_n$ to increase its resistance.

After all tap outputs are correlated with the error signal, the transfer function of the RC transmission line will match that of the reference filter with any required degree of precision depending on the number of taps provided and the care with which the weighting resistors are trimmed.

If desired, the frequency spectrum of the error signal can be given a spectral weighting to shade the precision of adjustment toward or away from the band edges.

Although the embodiment of FIG. 5 indicates sequential adjustment of each tap voltage divider, it is apparent that with automatic adjustment apparatus all tap dividers can be adjusted in parallel.

The filter synthesis technique described herein has the advantage that the network to be adjusted is included in a feedback loop. The process of adjustment produces devices which are tailored in a fashion such that each device compensates for variations in its own components, for example, imperfect spacing of the taps thereon. A different transfer characteristic may be obtained from the same basic RC transmission line structure merely by replacing the model of the desired filter.

While this invention has been described in terms of a specific embodiment, the principle thereof is susceptible of much wider application. For example, by analogy a lumped-constant LC comb filter can be used in place of the distributed-constant RC filter. In this case discrete frequency components are selected from the test impulse and each such component selectively attenuated according to a correlation with an error signal obtained by matching the comb filter output with that of a reference filter. The spirit and scope of this invention are to be measured by the following claims.

What is claimed is:

1. A distributed-constant transmission line adjustable to an arbitrary response characteristic comprising
- a nonconductive substrate,
- a base electrode deposited on said substrate,
- a continuous film of resistive material affixed to, but insulated from, said base electrode and exhibiting a substantially constant resistance and capacitance per unit length,
- spaced taps on said continuous film of resistive material,
- a pair of conductive summing buses deposited on said substrate,
- pairs of weighting resistance members deposited on said substrate and connecting each of said taps to respective ones of said summing buses,
- means providing a test signal between said resistive material and said base electrode, and means combining algebraically currents appearing on said summing buses at a common output point, said arbitrary response characteristic being determined by the relative values of weighting resistances selected at each said tap.

2. The distributed-constant transmission line of claim 1 in which said taps are spaced from one end of said continuous film of resistive material according to the square root of their index numbers.

3. The distributed-constant transmission line of claim 1 in which said algebraic combining means comprises a first operational amplifier having as input the signals from one of said summing buses and a second operational amplifier having as inputs the signals from the other of said summing buses and the output signals from said first operational amplifier.

4. The distributed-constant transmission line of claim 3 in which said operational amplifiers are integrated circuits affixed to said substrate.

5. In combination with a tapped transmission line having an input point and including weighting resistance members connecting each output tap to respective summing buses and algebraic summing means combining signals on the first of said summing buses with the inverted signals appearing on the other of said summing buses at a common point, apparatus for determining values of said weighting resistance members to cause said transmission line to exhibit a preselected response characteristic comprising a reference filter having said preselected response characteristic, means transmitting a train of impulses through said transmission line and said reference filter in parallel, means taking the difference in outputs of said filter and summing means due to each of said impulses, means correlating said difference with the output of any tap on said transmission line as an indication of whether the ratio of the values of resistance members connected to a given tap is to be increased or decreased, and means trimming said resistance members in accordance with the indications of said correlating means to minimize said difference.

6. The combination according to claim 5 in which said transmission line comprises a nonconductive substrate, a base electrode deposited on said substrate, and a continuous film of resistive material affixed to, but insulated from, said base electrode.

7. Apparatus for adjusting a distributed-constant transmission line to effect an arbitrary response characteristic comprising an input to said transmission line, a plurality of spaced taps along said line, a pair of resistive members conductively connected to each of said taps, a pair of conductive buses connected to outer terminals of each said pair of resistive members, means combining signals occurring on the respective buses in opposite polarity, a reference network of a preselected response characteristic, means transmitting in parallel an impulse simultaneously through said transmission line and said reference network, means taking the difference in outputs from said signal-combining means and said network due to said impulse as an error signal, means correlating said error signal with the output of each tap on said line, and means adjusting the ratio of values of the resistance members at each said tap responsive to said correlating means to minimize said error signal.

References Cited

UNITED STATES PATENTS

| | | | |
|---|---|---|---|
| 2,991,436 | 7/1961 | Banton | 324—57 X |
| 3,022,472 | 2/1962 | Tanenbaum et al. | 333—18 |
| 3,292,110 | 12/1966 | Becker et al. | 333—18 |
| 3,375,473 | 3/1968 | Lucky | 333—28 X |

EDWARD E. KUBASIEWICZ, Primary Examiner

U.S. Cl. X.R.

333—18, 70

PO-1050
(5/69)

UNITED STATES PATENT OFFICE
CERTIFICATE OF CORRECTION

Patent No. 3,466,538 Dated September 9, 1969

Inventor(s) Floyd K. Becker and Harry R. Rudin, Jr.

It is certified that error appears in the above-identified patent and that said Letters Patent are hereby corrected as shown below:

In the specification, at column 6, equation (4) should appear as follows:

$$\frac{\partial I}{\partial \alpha_i} = -2\int_0^\infty [h_i(t)] \left[ h(t) - \sum_{n=o}^{N} \alpha_n h_n(t) \right] dt = 0$$

Column 6, equation (5), that portion of the equation reading

"$\frac{\partial}{\partial \alpha_i}$" should read --$\frac{\partial I}{\partial \alpha_i}$-- .

SIGNED AND
SEALED
FEB 3 1970

(SEAL)
Attest:

Edward M. Fletcher, Jr.
Attesting Officer

WILLIAM E. SCHUYLER, JR.
Commissioner of Patents